US012609737B2

(12) United States Patent     (10) Patent No.:   US 12,609,737 B2

Gu et al.       (45) Date of Patent:    Apr. 21, 2026

(54) WIRELESS COMMUNICATION METHOD, APPARATUS, AND SYSTEM, AND DEVICE AND STORAGE MEDIUM

(71) Applicant: SHANGHAI WUQI MICROELECTRONICS CO., LTD., Shanghai (CN)

(72) Inventors: Qiang Gu, Shanghai (CN); Lin Xue, Shanghai (CN)

(73) Assignee: SHANGHAI WUQI MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/725,821

(22) PCT Filed: Jan. 26, 2022

(86) PCT No.: PCT/CN2022/074082

§ 371 (c)(1),
(2) Date: Jul. 1, 2024

(87) PCT Pub. No.: WO2023/123598

PCT Pub. Date: Jul. 6, 2023

(65) Prior Publication Data

US 2025/0070829 A1     Feb. 27, 2025

(30) Foreign Application Priority Data

Dec. 31, 2021    (CN) .......................... 202111672142.9

(51) Int. Cl.
    *H04L 1/02*        (2006.01)
    *H04B 7/0452*     (2017.01)
    *H04W 72/044*    (2023.01)

(52) U.S. Cl.
    CPC ........ *H04B 7/0452* (2013.01); *H04W 72/046* (2013.01)

(58) Field of Classification Search
    CPC .. H04B 7/0617; H04B 7/0695; H04B 7/0413; H04B 7/0408; H04B 7/0452;
                (Continued)

(56) References Cited

U.S. PATENT DOCUMENTS 9,985,714 B1    5/2018   Hou
2017/0093600 A1    3/2017   Li et al.
             (Continued)

FOREIGN PATENT DOCUMENTS

CN       102428723      4/2012
CN       102468946      5/2012
             (Continued)

OTHER PUBLICATIONS

International Search Report for PCT/CN2022/074082, entitled Wireless Communication Methods, Apparatus, Systems, Devices, and Storage Medium, issued on Aug. 30, 2022, including English translation, 5 pages.

(Continued)

*Primary Examiner* — Khai Tran

(74) *Attorney, Agent, or Firm* — Clark Hill PLC

(57) ABSTRACT

A wireless communication method, apparatus, and system, and device and storage medium are provided. The method comprises sending downlink data signal on the basis of calibration beam by means of signal access point, and sending resource unit allocation information to multi-stream converter by means of the signal access point, the calibration beam being calibrated beam between the signal access point and the multi-stream converter; demodulating the downlink data signal on the basis of the resource unit allocation information by means of the multi-stream converter to obtain signal data pointing to each access device; and on the basis of the signal data pointing to each access device and beam direction weight corresponding to each access device, (Continued)

sending, by means of the multi-stream converter, multi-stream signals pointing to a plurality of access devices, the beam direction weight being determined based on calibrated beam direction between the multi-stream converter and each access device.

20 Claims, 5 Drawing Sheets

(58) Field of Classification Search
CPC ..... H04B 17/11; H04L 5/0051; H04L 5/0048; H04W 72/046; H04W 52/0206
USPC .................................. 375/267, 260, 262, 299
See application file for complete search history.

(56) References Cited

U.S. PATENT DOCUMENTS

| | | | | |
|---|---|---|---|---|
| 2018/0103492 | A1 | 4/2018 | Akkarakaran et al. | |
| 2020/0382194 | A1* | 12/2020 | Park | H04W 72/21 |
| 2022/0182992 | A1* | 6/2022 | Kim | H04W 72/046 |
| 2022/0278729 | A1* | 9/2022 | Tsui | H04W 72/12 |
| 2024/0088987 | A1* | 3/2024 | Meyer | H04B 7/04013 |

FOREIGN PATENT DOCUMENTS

| | | |
|---|---|---|
| CN | 104871438 | 8/2015 |
| CN | 109756258 | 5/2019 |
| CN | 110912594 | 3/2020 |
| CN | 112865845 | 5/2021 |
| CN | 112994765 | 6/2021 |
| WO | 2018014173 | 1/2018 |

OTHER PUBLICATIONS

Written Opinion of International Search Report for PCT/CN2022/074082, entitled Wireless Communication Methods, Apparatus, Systems, Devices, and Storage Medium, issued on Aug. 30, 2022; including English translation, 5 pages.

Prosecution of Chinese Patent Appln No. 202111672142.9, published as CN114499614A, including first search report, First Office Action dated Sep. 6, 2024, 2nd Office Action dated Mar. 7, 2025, and Notice of Allowance dated Apr. 9, 2025, including English translations of same downloaded from Global Dossier; 60 pages total.

* cited by examiner

1

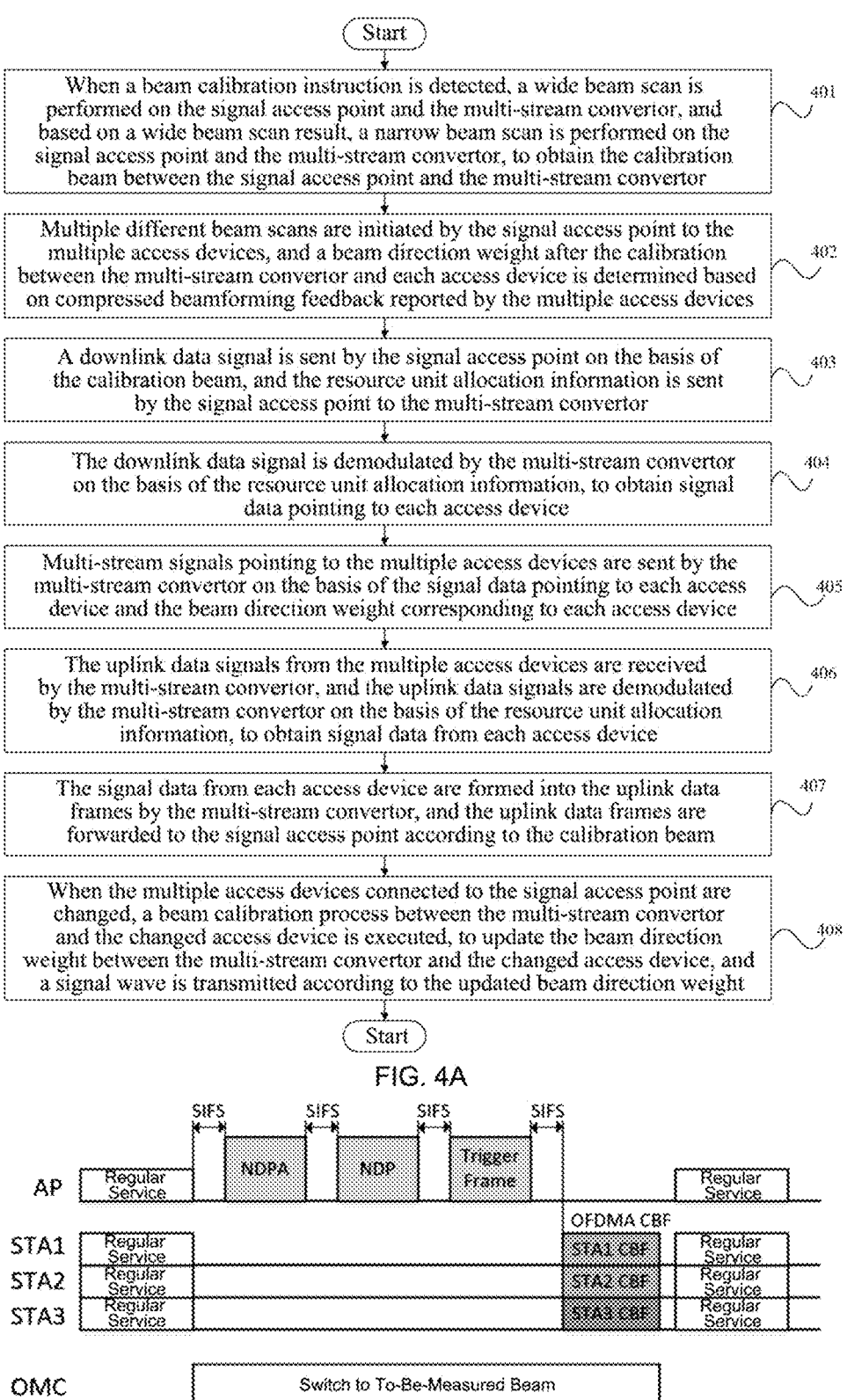

Start

When a beam calibration instruction is detected, a wide beam scan is performed on the signal access point and the multi-stream convertor, and based on a wide beam scan result, a narrow beam scan is performed on the signal access point and the multi-stream convertor, to obtain the calibration beam between the signal access point and the multi-stream convertor — 401

Multiple different beam scans are initiated by the signal access point to the multiple access devices, and a beam direction weight after the calibration between the multi-stream convertor and each access device is determined based on compressed beamforming feedback reported by the multiple access devices — 402

A downlink data signal is sent by the signal access point on the basis of the calibration beam, and the resource unit allocation information is sent by the signal access point to the multi-stream convertor — 403

The downlink data signal is demodulated by the multi-stream convertor on the basis of the resource unit allocation information, to obtain signal data pointing to each access device — 404

Multi-stream signals pointing to the multiple access devices are sent by the multi-stream convertor on the basis of the signal data pointing to each access device and the beam direction weight corresponding to each access device — 405

The uplink data signals from the multiple access devices are received by the multi-stream convertor, and the uplink data signals are demodulated by the multi-stream convertor on the basis of the resource unit allocation information, to obtain signal data from each access device — 406

The signal data from each access device are formed into the uplink data frames by the multi-stream convertor, and the uplink data frames are forwarded to the signal access point according to the calibration beam — 407

When the multiple access devices connected to the signal access point are changed, a beam calibration process between the multi-stream convertor and the changed access device is executed, to update the beam direction weight between the multi-stream convertor and the changed access device, and a signal wave is transmitted according to the updated beam direction weight — 408

Start

FIG. 4A

| | | SIFS | | SIFS | | SIFS | | SIFS | | | |
|---|---|---|---|---|---|---|---|---|---|---|---|

AP    Regular Service    NDPA    NDP    Trigger Frame    Regular Service

OFDMA CBF

STA1    Regular Service    STA1 CBF    Regular Service
STA2    Regular Service    STA2 CBF    Regular Service
STA3    Regular Service    STA3 CBF    Regular Service OMC    Switch to To-Be-Measured Beam

FIG. 4B

WIRELESS COMMUNICATION METHOD, APPARATUS, AND SYSTEM, AND DEVICE AND STORAGE MEDIUM

CROSS-REFERENCE TO RELATED APPLICATION

This application is a U.S. National Stage under 35 U.S.C. 371 of International application No. PCT/CN2022/074082, filed 26 Jan. 2022, published as WO2023/123598A1, and which claims benefit of and priority to Chinese patent application No. 202111672142.9, filed with the China National Intellectual Property Administration on Dec. 31, 2021, published as CN114499614A, and entitled "WIRELESS COMMUNICATION METHOD, APPARATUS, SYSTEM, DEVICE AND STORAGE MEDIUM", all of which are incorporated herein by reference in entirety.

TECHNICAL FIELD

The present disclosure relates to the field of communication technologies, and specifically to a wireless communication method, an apparatus, a system, a device and a storage medium.

BACKGROUND ART

As the whole society enters the era of intelligence, wireless interconnection has become the foundation of the whole information society, and as one of the most important wireless communication techniques, WiFi is widely applied. The high-network-speed and high-bandwidth WiFi 6 (802.11ax) standard has gradually become a mainstream WiFi product in the future. A key technique MU-MIMO (Multi-User Multiple-Input Multiple-Output) newly added to WiFi 6 makes full use of different spatial distribution positions of different user devices (Stations, STAs for short), and realizes multi-user uplink and downlink data concurrency.

However, there are difficulties in indoor application of this technique, for example, if a WiFi access point (AP for short) and multiple STAs are located in different rooms and blocked by a wall, it is difficult to form spatial multiple streams from the AP to the STAs therebtween. The WiFi network is mainly applied to various kinds of indoor environments, and thus this problem restricts the application and implementation of the WiFi 6 MU-MIMO technique.

Conventional WiFi cross-room coverage schemes, such as WiFi relay and WiFi mesh, demodulate and decode received data packets, parse data of MAC layer, and then forward it, thus the delay is large. Meanwhile, these devices transmit using omnidirectional antennas, and do not support multi-stream transmitting and receiving of MU-MIMO, thus having the drawbacks of small signal coverage, low rate and so on.

SUMMARY

Embodiments of the present disclosure provide a wireless communication method, an apparatus, a system, a device and a storage medium, wherein when an access point and access devices are located in difference spaces, multi-stream signal concurrency between the access point and the access devices may be realized, thereby expanding the application scope of wireless communication and improving the application flexibility.

Embodiments of the present disclosure provide a wireless communication method, applied to a wireless communication system. The wireless communication system may include: a signal access point, a multi-stream convertor and multiple access devices. The method may include steps of: sending, by the signal access point, a downlink data signal on the basis of a calibration beam, and sending, by the signal access point, resource unit allocation information to the multi-stream convertor, wherein the calibration beam may be a beam after calibration between the signal access point and the multi-stream convertor; demodulating, by the multi-stream convertor, the downlink data signal on the basis of the resource unit allocation information, to obtain signal data pointing to each of the access devices; and sending, by the multi-stream convertor, multi-stream signals pointing to the multiple access devices, on the basis of the signal data pointing to each of the access devices and a beam direction weight corresponding to each of the access devices, wherein the beam direction weight is determined on the basis of a beam direction after calibration between the multi-stream convertor and each of the access devices.

In an optional implementation, before the step of sending, by the signal access point, a downlink data signal on the basis of a calibration beam, the method may further include a step of performing, when detecting a beam calibration instruction, a wide beam scan on the signal access point and the multi-stream convertor, and performing, based on a wide beam scan result, a narrow beam scan on the signal access point and the multi-stream convertor, to obtain the calibration beam between the signal access point and the multi-stream convertor.

In an optional implementation, before the step of sending, by the signal access point, a downlink data signal on the basis of a calibration beam, the method may further include a step of: initiating, when detecting a beam calibration instruction, by the signal access point, multiple different beam scans to the multiple access devices, and determining, based on compressed beamforming feedback reported by the multiple access devices, a beam direction weight after calibration between the multi-stream convertor and each of the access devices.

In an optional implementation, the step of initiating, by the signal access point, multiple different beam scans to the multiple access devices, and determining, based on compressed beamforming feedback reported by the multiple access devices, a beam direction weight after calibration between the multi-stream convertor and each of the access devices may include steps of: sending the resource unit allocation information to the multi-stream convertor, and receiving number of wide beams returned by the multi-stream convertor; instructing the multi-stream convertor to send multiple wide beams, and sending a signal measurement instruction to the multiple access devices; sending detection data frames to the multiple access devices, the detection data frames being configured to instruct the multiple access devices to detect signal strength received; sending trigger frames to the multiple access devices, the trigger frames being configured to instruct the multiple access devices to report detected signal strength; receiving first compressed beamforming feedback reported by each of the access devices, the first compressed beamforming feedback carrying a first signal strength set of the multiple wide beams detected by each of the access devices; and selecting, for each of the access devices, a target wide beam corresponding to a maximum value in the first signal strength set, to form an optimal wide beam set.

In an optional implementation, the step of initiating, by the signal access point, multiple different beam scans to the multiple access devices, and determining, based on compressed beamforming feedback reported by the multiple access devices, a beam direction weight after calibration between the multi-stream convertor and each of the access devices may further include steps of: instructing the multi-stream convertor to divide the target wide beam in the optimal wide beam set into multiple narrow beams, instructing the multi-stream convertor to send the multiple narrow beams, and sending a signal measurement instruction to the multiple access devices; sending the detection data frames to the multiple access devices, and sending the trigger frames to the multiple access devices; receiving second compressed beamforming feedback reported by each of the access devices, the second compressed beamforming feedback carrying a second signal strength set of the multiple narrow beams detected by each of the access devices; and selecting, for each of the access devices, a target narrow beam corresponding to a maximum value in the second signal strength set, and taking the target narrow beam as a beam direction weight after calibration between the multi-stream convertor and the corresponding access device.

In an optional implementation, the method may further include steps of: receiving, by the multi-stream convertor, uplink data signals from the multiple access devices, and demodulating, by the multi-stream convertor, the uplink data signals on the basis of the resource unit allocation information, to obtain signal data from each of the access devices; and forming, by the multi-stream convertor, the signal data from each of the access devices into uplink data frames, and forwarding the uplink data frames to the signal access point according to the calibration beam.

In an optional implementation, the method may further include steps of: sending, by the signal access point, a beam detection signal to the multi-stream convertor; forwarding, by the multi-stream convertor, the beam detection signal to the multiple access devices on the basis of the beam direction weight corresponding to each of the access devices; and re-executing, when there is a target access device that reports a signal strength less than a warning threshold in the multiple access devices, a beam calibration process on the wireless communication system, and transmitting a signal wave according to beam information after recalibration.

In an optional implementation, the step of sending, by the signal access point, a beam detection signal to the multi-stream convertor may further include a step of: starting irregularly the beam measurement process by the signal access point, to check a current beam using state.

In an optional implementation, the method may further include a step of: executing, when the multiple access devices connected to the signal access point are changed, a beam calibration process between the multi-stream convertor and a changed access device, to update the beam direction weight between the multi-stream convertor and the changed access device, and transmitting a signal wave according to the updated beam direction weight.

Embodiments of the present disclosure further provide a wireless communication apparatus, applied to a wireless communication system. The wireless communication system may include: a signal access point, a multi-stream convertor and multiple access devices. The apparatus may include: a sending module, configured to send, by the signal access point, a downlink data signal on the basis of a calibration beam, and send, by the signal access point, resource unit allocation information to the multi-stream convertor, wherein the calibration beam may be a beam after calibration between the signal access point and the multi-stream convertor; a demodulation module, configured to demodulate, by the multi-stream convertor, the downlink data signal on the basis of the resource unit allocation information, to obtain signal data pointing to each of the access devices; and a first forwarding module, configured to send, by the multi-stream convertor, multi-stream signals pointing to the multiple access devices, on the basis of the signal data pointing to each of the access devices and a beam direction weight corresponding to each of the access devices, wherein the beam direction weight may be determined on the basis of a beam direction after calibration between the multi-stream convertor and each of the access devices.

In an optional implementation, the apparatus may further include: a first calibration module, configured to perform, before sending, by the signal access point, a downlink data signal on the basis of a calibration beam, when detecting a beam calibration instruction, a wide beam scan on the signal access point and the multi-stream convertor, and perform, based on a wide beam scan result, a narrow beam scan on the signal access point and the multi-stream convertor, to obtain the calibration beam between the signal access point and the multi-stream convertor.

In an optional implementation, the apparatus may further include: a second calibration module, configured to initiate, before sending, by the signal access point, a downlink data signal on the basis of a calibration beam, when detecting a beam calibration instruction, multiple different beam scans by the signal access point to the multiple access devices, and determine, based on compressed beamforming feedback reported by the multiple access devices, the beam direction weight after calibration between the multi-stream convertor and each of the access devices.

In an optional implementation, the second calibration module may be configured to send the resource unit allocation information to the multi-stream convertor, and receive the number of wide beams returned by the multi-stream convertor; instruct the multi-stream convertor to send multiple wide beams, and send a signal measurement instruction to the multiple access devices; send detection data frames to the multiple access devices, the detection data frames being configured to instruct the multiple access devices to detect strength of received signals; send trigger frames to the multiple access devices, the trigger frames being configured to instruct the multiple access devices to report detected signal strength; receive first compressed beamforming feedback reported by each of the access devices, the first compressed beamforming feedback carrying a first signal strength set of multiple wide beams detected by each of the access devices; and select, for each of the access devices, a target wide beam corresponding to a maximum value in the first signal strength set, to form an optimal wide beam set In an optional implementation, the second calibration module may further be configured to instruct the multi-stream convertor to divide the target wide beam in the optimal wide beam set into multiple narrow beams, instruct the multi-stream convertor to send the multiple narrow beams, and send a signal measurement instruction to the multiple access devices; send the detection data frames to the multiple access devices, and send the trigger frames to the multiple access devices; receive second compressed beamforming feedback reported by each of the access devices, the second compressed beamforming feedback carrying a second signal strength set of the multiple narrow beams detected by each of the access devices; and select, for each of the access devices, a target narrow beam corresponding to a maximum value in the second signal strength set, and take the target narrow beam as a beam direction weight after the calibration between the multi-stream convertor and the corresponding access device.

In an optional implementation, the apparatus may further include: a receiving module, configured to receive, by the multi-stream convertor, the uplink data signals from the multiple access devices, and demodulate, by the multi-stream convertor, the uplink data signals on the basis of the resource unit allocation information, to obtain signal data from each of the access devices; and a second forwarding module, configured to form, by the multi-stream convertor, the signal data from each of the access devices into the uplink data frames, and forward the uplink data frames to the signal access point according to the calibration beam.

In an optional implementation, the apparatus may further include: a detection module, configured to send, by the signal access point, a beam detection signal to the multi-stream convertor; a forwarding module, configured to forward, by the multi-stream convertor, the beam detection signal to the multiple access devices on the basis of the beam direction weight corresponding to each of the access devices; and a first recalibration module, configured to re-execute, when there is a target access device that reports signal strength less than a warning threshold in the multiple access devices, a beam calibration process on the wireless communication system, and transmit a signal wave according to beam information after recalibration.

In an optional implementation, the apparatus may further include: a second recalibration module, configured to execute, when the multiple access devices connected to the signal access point have change, a beam calibration process between the multi-stream convertor and a changed access device, to update a beam direction weight between the multi-stream convertor and the changed access device, and transmit a signal wave according to the updated beam direction weight.

Embodiments of the present disclosure further provide a wireless communication system, which may include: a signal access point, configured to access a network signal; a multi-stream convertor, connected to the signal access point, and configured to demodulate and forward a downlink data signal from the signal access point; and an access device, accessing a network through a signal wave of the signal access point, wherein the multi-stream convertor is further configured to send, on the basis of a demodulation result and resource unit allocation information, multi-stream signals pointing to the multiple access devices; and the signal access point is further configured to adjust, according to a received signal measurement result, a beam direction weight between the multi-stream convertor and each of the access devices.

Embodiments of the present disclosure further provide an electronic device, which may include: a memory, configured to store a computer program; and a processor, configured to execute the method according to the embodiments of the present disclosure and any implementation thereof.

In an optional implementation, the electronic device may be a device having a PLC function, such as a gateway device, a mobile phone, a tablet computer, a notebook computer, a desktop computer or a large-scale computing system composed of multiple computers.

Embodiments of the present disclosure further provide a non-transient electronic device-readable storage medium, which may include: a program, configured to make, when run by an electronic device, the electronic device execute the method according to the embodiments of the present disclosure and any implementation thereof.

In an optional implementation, the storage medium may be a magnetic disk, an optical disk, a read-only memory (ROM), a random access memory (RAM), a flash memory, a hard disk drive (abbreviated as HDD), a solid-state drive (SSD) or the like. The storage medium may also include a combination of memories of the kinds described above.

Regarding the wireless communication method, apparatus, system, device and storage medium provided in the present disclosure, firstly, after the calibration performed between the signal access point and the multi-stream convertor, the calibration beam is obtained; then a downlink data signal is sent by the signal access point on the basis of the calibration beam, and resource unit allocation information is sent by the signal access point to the multi-stream convertor, and the downlink data signal is demodulated by the multi-stream convertor on the basis of resource unit allocation information, to obtain signal data pointing to each of the access devices; and finally, multi-stream signals pointing to the multiple access devices are sent by the multi-stream convertor, on the basis of the signal data pointing to each of the access devices and a beam direction weight corresponding to each of the access devices. In this way, multi-data-stream concurrency of the wireless communication under dynamic calibration is realized, which improves the stability and effectiveness of the wireless communication.

BRIEF DESCRIPTION OF DRAWINGS

In order to more clearly illustrate technical solutions of embodiments in the present disclosure, drawings that need to be used in the embodiments of the present disclosure will be briefly introduced below. It should be understood that the drawings merely show some embodiments of the present disclosure, and thus should not be considered as limitation to the scope. Those ordinarily skilled in the art could also obtain other relevant drawings according to these drawings without using any inventive efforts.

FIG. 4A is a schematic flow chart of a wireless communication method provided in embodiments of the present disclosure;

FIG. 4B is a schematic diagram of a beam measurement process in embodiments of the present disclosure;

DETAILED DESCRIPTION OF EMBODIMENTS

The technical solutions in the embodiments of the present disclosure will be described below in conjunction with the drawings in the embodiments of the present disclosure. In the description of the present disclosure, the terms such as "first" and "second" are only used for distinguishing the description and cannot be construed as indicating or implying importance in the relativity.

In order to clearly describe the technical solutions in the present disclosure, the technical terms involved are now explained as follows:

OFDMA: Orthogonal Frequency Division Multiple Access.

RU: Resource Unit, a resource unit of OFDMA.

AAU: Active Antenna Unit.

PLC: Power Line Communication.

MU-MIMO: Multi-User Multiple-Input Multiple-Output.

Figures 1, 2:
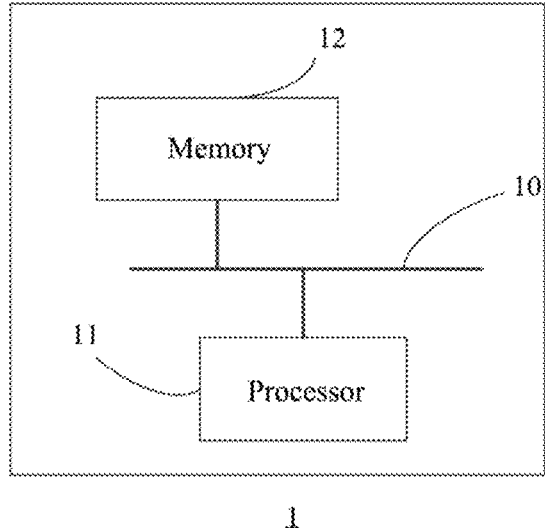
FIG. 1 is a structural schematic diagram of an electronic device provided in embodiments of the present disclosure.
FIG. 2 is a structural schematic diagram of a wireless communication system provided in embodiments of the present disclosure.

As shown in FIG. 1, the present embodiment provides an electronic device 1, which may include: at least one processor 11 and a memory 12. One processor is taken as an example in FIG. 1. The processor 11 and the memory 12 may be connected via a bus 10. The memory 12 may store an instruction that can be executed by the processor 11. The instruction can be executed by the processor 11, to make the electronic device 1 execute all or a part of processes of methods in the following embodiments, so that when an access point and an access device are located in different spaces, multi-stream signal concurrency between the access point and the access device is realized, thereby expanding the application scope of the wireless communication and improving the application flexibility.

In an optional implementation, the electronic device 1 may be a device having a PLC function, such as a gateway device, a mobile phone, a tablet computer, a notebook computer, a desktop computer or a large-scale computing system composed of multiple computers.

Referring to FIG. 2, it shows a wireless communication system in an embodiment of the present disclosure, which may include: a signal access point AP, a multi-stream convertor OMC and multiple access devices STAs, wherein the signal access point AP may be configured to access a network signal; the multi-stream convertor OMC is connected to the signal access point AP, and may be configured to demodulate and forward a downlink data signal from the signal access point AP; the access device STA may access a network through a signal wave of the signal access point AP. In the above, the multi-stream convertor OMC may further be configured to send, on the basis of a demodulation result and resource unit allocation information, multi-stream signals pointing to the multiple access devices STAs. The signal access point AP may further be configured to adjust, according to a received signal measurement result, a beam direction weight between the multi-stream convertor OMC and each access device STA.

Taking a WiFi-based wireless communication system as an example, the signal access point may be a WiFi signal access point (AP for short), and the multi-stream convertor may be a WiFi OFDMA MIMO convertor (OMC for short hereinafter). In the above, the WiFi AP may provide a service of wirelessly accessing Internet for the access device (Station, STA for short), and one WiFi AP may be connected with multiple access devices STAs, for example, access devices STA1, STA2 . . . STAm in FIG. 2.

The WiFi AP may include: a WiFi gate and a PLC Host.

The multi-stream convertor OMC may include: a main control unit (MCU), a physical process unit (PPU for short), an array antenna unit (AAU for short) and a PLC client. The PLC Host of the access point AP and the PLC client of the multi-stream convertor OMC may establish a communication link through a power line, thus realizing message interaction between the AP and the OMC. The multi-stream convertor OMC may realize conversion between OFDMA data packets sent and received by the access point AP and MU-MIMO multiple streams sent and received by the access devices STAs.

In actual scenarios, the access point AP and the multiple user devices STAs are often located in different rooms, and the communication therebetween is quite likely to be blocked by a room wall or other obstacles, and thus MU-MIMO spatial multiple streams cannot be directly constructed (as denoted by dotted lines in FIG. 2).

In the present disclosure, by arranging an OMC device in a room aisle (or other positions that avoid obstacles), OFDMA data frames sent by the access point AP to the access devices STAs are processed by the convertor OMC into MU-MIMO spatial multiple streams, and then forwarded to various access devices STAs, so as to realize multi-stream concurrency of multiple user devices in a downlink direction (DL-MIMO). In an uplink direction, multi-stream data from the access devices STAs in different locations are aggregated at the multi-stream convertor OMC, merged into OFDMA data frames, and then forwarded to the access point AP, thereby realizing multi-stream concurrency of the multiple user devices in the uplink direction (UL-MIMO).

Hereinafter, a wireless communication method according to embodiments of the present disclosure is further described in detail in conjunction with the drawings.

Figure 3A:
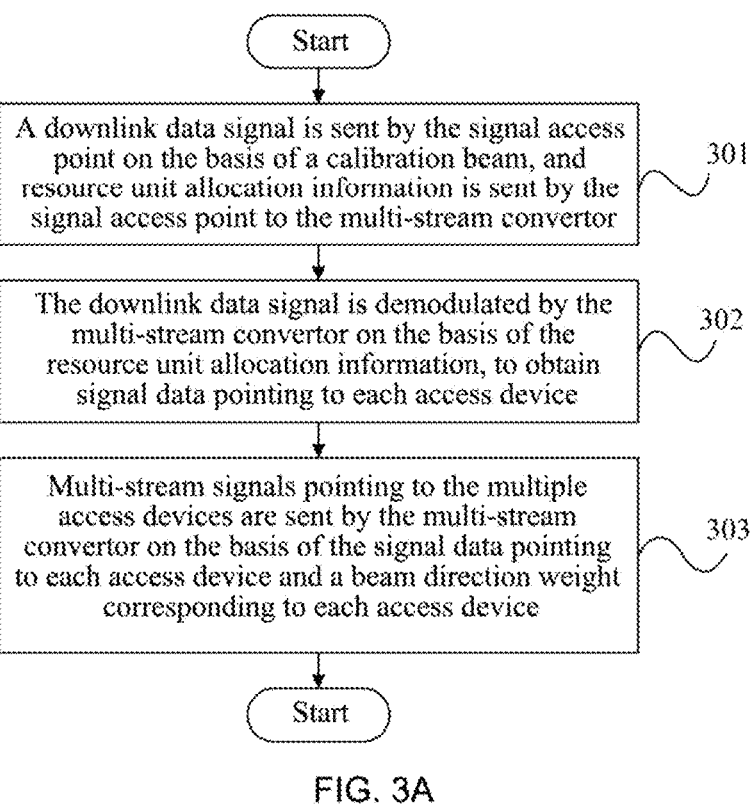
FIG. 3A is a schematic flow chart of a wireless communication method provided in embodiments of the present disclosure.

Referring to FIG. 3A, it shows a wireless communication method according to an embodiment of the present disclosure. This method may be executed by the electronic device 1 as shown in FIG. 1, and may be applied to the wireless communication system as shown in FIG. 2, so that when the access point AP and the access devices STAs are located in different spaces, multi-stream signal concurrency is realized between the access point AP and the access devices STAs, thereby expanding the application range of the wireless communication and improving the application flexibility. This method optionally includes the following steps.

At Step 301: a downlink data signal is sent by the signal access point AP on the basis of a calibration beam, and resource unit allocation information is sent by the signal access point AP to the multi-stream convertor OMC.

In the present step, the calibration beam may be a beam after calibration between the signal access point AP and the multi-stream convertor OMC. For a scenario where the access point AP and the access devices STAs are located in different spaces, for example, respectively located in different rooms, by installing the multi-stream convertor OMC in a room aisle, the signal access point AP can control the multi-stream convertor OMC using a power-line carrier (PLC) network. After the calibration from the signal access point AP to the multi-stream convertor OMC is completed, for the downlink data signal, the signal access point AP may send downlink OFDMA (namely, DL OFDMA) frames carrying data of various access devices STAs according to the calibration beam. Meanwhile, the signal access point AP may send, through the PLC network, "OFDMA RU Allocation Setup" message to the multi-stream convertor OMC, so as to inform the multi-stream convertor OMC of an allocation situation of each access device STA on the OFDMA RU.

At Step 302: the downlink data signal is demodulated by the multi-stream convertor OMC on the basis of the resource unit allocation information, to obtain signal data pointing to each access device STA.

In the present step, after receiving a downlink OFDMA signal sent by the access point AP, the multi-stream convertor OMC may demodulate the downlink OFDMA signal on the basis of the RU information occupied by each access device STA, and the signal data pointing to each access device STA may be obtained. That is to say, the multi-stream convertor OMC may be taken as a transfer station, so as to avoid, in a situation where there is an obstruction area between the signal access point AP and the access devices STAs, that the signal access point AP and the access devices STAs cannot directly perform the multi-stream concurrency.

At Step 303: multi-stream signals pointing to the multiple access devices STAs are sent by the multi-stream convertor OMC, on the basis of the signal data pointing to each access device STA and a beam direction weight corresponding to each access device STA.

In the present step, the beam direction weight may be determined on the basis of a beam direction after the calibration between the multi-stream convertor OMC and each access device STA. The beam directions pointing to the access devices STAs may be obtained in advance through a beam calibration process. After the calibration between the multi-stream convertor OMC and the access devices STAs is completed, the multi-stream convertor OMC may transmit the signal data pointing to each access device STA, demodulated in Step 302, according to the beam direction weight corresponding to each access device STA, and allocate data of various access devices STAs distributed on different RUs to different beam directions, so as to form spatial multiple streams and then send them through an array antenna, thus realizing the downlink MIMO (DL-MIMO) of the access devices STAs. In this way, even if there is an obstruction area between the signal access point AP and the access devices STAs, the multi-stream concurrency still can be successfully accomplished.

In an optional implementation, it may be assumed that a demodulated symbol of a certain access device $STA_i$ in Step 302 is represented as $SIG_i$, and its corresponding beam direction weight after the calibration is represented as $W_i$, then a symbol forwarded by the multi-stream convertor OMC to the access device $STA_i$ may be represented as: $W_i * SIG_i$. Given that there are M access devices STAs in total, total symbols sent by the OMC to various STAs are represented as:

$$SIG_{mimo} = \sum_{i=0}^{M-1} W_i * SIG_i$$

The OMC may form the symbols $SIG_{mimo}$ into multiple beams through an antenna array AAU, and the beams (Beamforming, BF) may point to different access devices STAs. As such, the various access devices STAs may receive the downlink data frames (Downlink Physical Protocol Data Unit, DL PPDU for short).

At Step 304: uplink data signals from the multiple access devices STAs are received by the multi-stream convertor OMC, and the uplink data signals are demodulated by the multi-stream convertor OMC on the basis of the resource unit allocation information, to obtain signal data from each access device STA.

In the present step, for the uplink direction, uplink data frames (Uplink Physical Protocol Data Unit, UL PPDU for short) sent by various access devices STAs may be carried on different RUs, and the multi-stream convertor OMC may perform demodulation according to allocation information on known data of the access devices STAs on OFDMA RUs, to obtain signal data from each access device STA.

At Step 305: the signal data from each access device STA are formed into the uplink data frames by the multi-stream convertor OMC, and the uplink data frames are forwarded to the signal access point AP according to the calibration beam.

In the present step, the multi-stream convertor OMC may re-form the signal data from each access device STA into the uplink OFDMA data frames (UL OFDMA), and send them to the signal access point AP in a reverse direction of the calibration beam from the signal access point AP to the multi-stream convertor OMC. In this way, uplink-MIMO (UL-MIMO for short) can be realized.

Figure 3B:
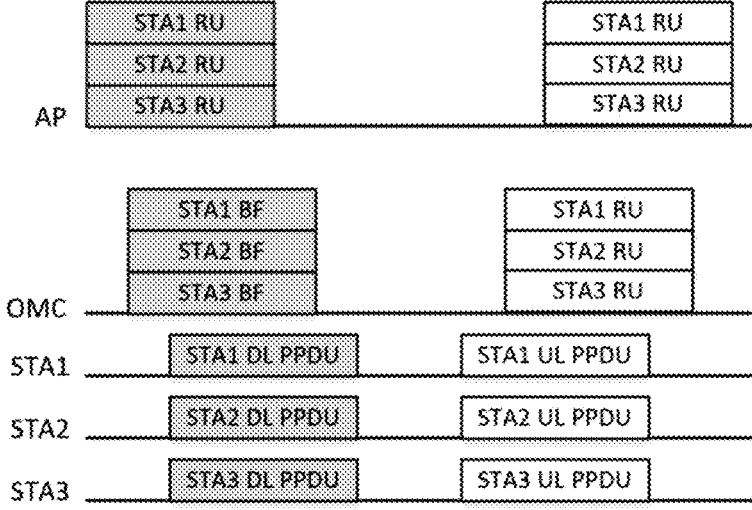
FIG. 3B is a schematic diagram of an AP realizing MU-MIMO bidirectional transmission with STAs in next rooms using an OMC in embodiments of the present disclosure.

As shown in FIG. 3B, it is a schematic diagram of the signal access point AP performing MU-MIMO bidirectional transmission with multiple access devices STAs in a next room (taking STA1, STA2, and STA3 as examples) using the multi-stream convertor OMC according to embodiments of the present disclosure.

The above wireless communication method can realize, for scenarios where the signal access point AP and the access devices STAs are located in different rooms, the multi-stream concurrency between the signal access point AP and the access devices STAs may be realized by providing the multi-stream convertor OMC in a room aisle, and forwarding by the multi-stream convertor OMC. In this way, the problem that it is difficult to implement the WiFi6 MU-MIMO technique in indoor environments may be effectively solved, and only a WiFi physical symbol is processed, which, compared with the WiFi relay and WiFi Mesh, has the advantages of high processing speed and low delay, and realizes the MU-MIMO concurrency, increases a signal coverage range, and improves a network accessing speed of the user devices. In addition, the multi-stream convertor OMC in the embodiments of the present disclosure only needs a household socket, and does not require a wired network connection, thus being simple and flexible in networking, which is extremely advantageous to upgrading finished indoor sites to the WiFi network.

Referring to FIG. 4A, it shows a wireless communication method according to an embodiment of the present disclosure. This method may be executed by the electronic device 1 as shown in FIG. 1, and may be applied to the wireless communication system as shown in FIG. 2, so that when the access point AP and the access devices STAs are located in different spaces, multi-stream signal concurrency is realized between the access point AP and the access devices STAs, thereby expanding the application range of the wireless communication and improving the application flexibility. This method optionally includes the following steps.

At Step 401: when a beam calibration instruction is detected, a wide beam scan is performed on the signal access point AP and the multi-stream convertor OMC, and based on a wide beam scan result, a narrow beam scan is performed on the signal access point AP and the multi-stream convertor OMC, to obtain the calibration beam between the signal access point AP and the multi-stream convertor OMC.

In the present step, in order to realize the multi-stream concurrency between the signal access point AP and the access devices STAs accurately through forwarding of the multi-stream convertor OMC, a two-stage beam calibration needs to be completed in advance: 1, beam calibration from the signal access point AP to the multi-stream convertor OMC; and 2, beam calibration from the multi-stream convertor OMC to the multi-access devices STAs. In the above, the beam calibration instruction may be manually triggered through a button on the AP, triggered by a specific event, or periodically triggered. A triggering mode is not limited.

First, a beam calibration process from the signal access point AP to the multi-stream convertor OMC is performed.

The beam calibration in this stage may be divided into two steps of wide beam scan and narrow beam scan. The AP may obtain an optimal wide beam direction from the AP to the OMC through the wide beam scan. Specifically, the AP sends multiple wide beams, the OMC performs signal strength detection on each received wide beam, reports a signal strength detection result to the AP, and takes a wide beam corresponding to a maximum signal strength value as the optimal wide beam direction from the AP to the OMC. Then optionally, a finer narrow beam scan is performed within the selected wide beam range, and likewise an optimal use narrow beam direction from the AP to the OMC may be obtained. The optimal use narrow beam direction may be determined as the calibration beam between the signal access point AP and the multi-stream convertor OMC.

In the above scanning process, each time the AP configures one wide beam direction, a message is sent to the OMC through the PLC network, to notify the OMC to measure strength of a signal sent by the AP. After completing measurement, the OMC reports a result to the AP, and the AP may select, according to the collected signal strengths of various beams, a beam corresponding to the maximum signal strength value as an optimal beam.

At Step 402: multiple different beam scans are initiated by the signal access point AP to the multiple access devices STAs, and a beam direction weight after the calibration between the multi-stream convertor OMC and each access device STA is determined based on compressed beamforming feedback reported by the multiple access devices STAs.

In the present step, after the beam calibration from the AP to the OMC is completed, the beam calibration from the OMC to various STAs may be started. The AP initiates scanning of different beams, and after setting corresponding beams, the OMC may find use beam directions of various STAs by receiving the compressed beamforming feedback (CBF for short) reported by various STAs.

In an optional implementation, Step 402 specifically may include: sending the resource unit allocation information to the multi-stream convertor OMC, and receiving the number of wide beams returned by the multi-stream convertor OMC; instructing the multi-stream convertor OMC to send multiple wide beams, and sending a signal measurement instruction to the multiple access devices STAs; sending detection data frames to the multiple access devices STAs, the detection data frames being configured to instruct the multiple access devices STAs to detect strength of received signals; sending trigger frames to the multiple access devices STAs, the trigger frames being configured to instruct the multiple access devices STAs to report detected signal strength; receiving first compressed beamforming feedback reported by each access device STA, the first compressed beamforming feedback carrying a first signal strength set of multiple wide beams detected by each access device STA; and selecting, for each access device STA, a target wide beam corresponding to a maximum value in the first signal strength set, to form an optimal wide beam set.

In the present step, a beam calibration process from the OMC to each STA may also be divided into two steps of wide beam scan and narrow beam scan. First, the wide beam scan is performed. In conjunction with FIG. 4B, three access devices STA1, STA2, and STA3 are taken as an example, and a specific process is as follows:

At Step 1: the AP may send "OFDMA RU Allocation Setup" message to the OMC through the PLC network, the message containing an allocation situation of each STA in OFDMA data frame. The OMC may set the number n of wide beams to be scanned and a wide beam sequence $\{wb_0, wb_1, wb_2 \ldots wb_{n-1}\}$, and then feedback the number n of wide beams to be scanned by the AP.

At Step 2: the AP may initiate n wide beam measurements (n is an integer), and before each wide beam measurement, the AP sends a message to the OMC through the PLC network to notify it to enter a beam measurement time slice. As shown in FIG. 4B, taking an i-th wide beam measurement as an example, the AP sends "i-th Wide Beam Measurement" message to the OMC, and the OMC sets a beam to the STAs to be $wb_i$. Subsequently, the AP sends "Null Data Packet Announcement" (NDPA for short), to notify various STAs to perform the beam measurement, and then sends "Null Data Packet" (NDP for short) as a detection frame for the measurement of various STAs, and finally the AP sends a trigger frame (TF for short) to notify various STAs to report measurement results. The various STAs can report the received signal strength in the CBF by means of OFDMA multiplexing. The OMC can receive the CBF reported by various STAs, thus completing the measurement of the $wb_i$ beam. After all of the n wide beam measurements are completed, a target wide beam corresponding to a maximum value in the first signal strength set may be taken as the optimal wide beam of corresponding STA. In this way, the OMC obtains the optimal wide beam of each STA, where it is assumed that the optimal wide beam set of M STAs contains m beams (since there are cases where different STAs have the same optimal wide beam, m is less than or equal to M, M being an integer).

In an optional implementation, Step 402 specifically may include: initiating, by the signal access point AP, multiple different beam scans to the multiple access devices STAs, and determining, based on compressed beamforming feedback reported by the multiple access devices STAs, a beam direction weight after the calibration between the multi-stream convertor OMC and each access device STA, may further include: instructing the multi-stream convertor OMC to divide the target wide beam in the optimal wide beam set into multiple narrow beams, instructing the multi-stream convertor OMC to send the multiple narrow beams, and sending a signal measurement instruction to the multiple access devices STAs; sending the detection data frames to the multiple access devices STAs, and sending the trigger frames to the multiple access devices STAs; receiving second compressed beamforming feedback reported by each access device STA, the second compressed beamforming feedback carrying a second signal strength set of the multiple narrow beams detected by each access device STA; and selecting, for each access device STA, a target narrow beam corresponding to a maximum value in the second signal strength set, and taking the target narrow beam as a beam direction weight after the calibration between the multi-stream convertor OMC and the corresponding access device STA.

In the present step, after the wide beam scan from the OMC to the various STAs is completed, a narrow beam scan process from the OMC to various STAs may be performed. Specifically, in conjunction with the above contents shown in FIG. 4B, the OMC may further optionally divide the m wide beams obtained in the above Step 2 into k narrow beams, represented as $\{nb_0, nb_1, nb_2 \ldots nb_{k-1}\}$. Then "Enter Narrow Beam Measurement" message may be sent to the AP through the PLC network, the message containing the number k of the narrow beams to be scanned. Subsequently, the AP may initiate k narrow beam measurements. The narrow beam process is similar to Step 2. Taking an j-th narrow beam measurement as an example, the AP sends "j-th Narrow Beam Measurement" message to the OMC, and the OMC sets a beam to the STAs to be nb_j. Subsequently, the AP sends "Null Data Packet Announcement (NDPA for short)", to notify various STAs to perform the beam measurement, and then sends "Null Data Packet" (NDP for short) as a detection frame for the measurement of various STAs, and finally the AP sends a trigger frame TF to notify various STAs to report measurement results. The various STAs may report the received signal strength in the CBF by means of OFDMA multiplexing. The OMC may receive the CBF reported by various STAs, thus completing the measurement of the nb_j beam. After all of the k narrow beam measurements are completed, the OMC takes a target narrow beam corresponding to the maximum value in the second signal strength set as the optimal narrow beam of corresponding STA. In this way, the OMC may obtain the optimal narrow beam of each STA, and the optimal narrow beam is taken as beam direction weights after calibration between the multi-stream convertor OMC and the corresponding access device STA.

At step 403: a downlink data signal is sent by the signal access point AP on the basis of the calibration beam, and the resource unit allocation information is sent by the signal access point AP to the multi-stream convertor OMC. For details, reference is made to the description of Step 301 in the above embodiment.

At Step 404: the downlink data signal is demodulated by the multi-stream convertor OMC on the basis of the resource unit allocation information, to obtain signal data pointing to each access device STA. For details, reference is made to the description of Step 302 in the above embodiment.

At Step 405: multi-stream signals pointing to the multiple access devices STAs are sent by the multi-stream convertor OMC on the basis of the signal data pointing to each access device STA and the beam direction weight corresponding to each access device STA. For details, reference is made to the description of Step 303 in the above embodiment.

At Step 406: the uplink data signals from the multiple access devices STAs are received by the multi-stream convertor OMC, and the uplink data signals are demodulated by the multi-stream convertor OMC on the basis of the resource unit allocation information, to obtain signal data from each access device STA. For details, reference is made to the description of Step 304 in the above embodiment.

At Step 407: the signal data from each access device STA are formed into the uplink data frames by the multi-stream convertor OMC, and the uplink data frames are forwarded to the signal access point AP according to the calibration beam. For details, reference is made to the description of Step 305 in the above embodiment.

In actual application scenarios, the user devices connected to the AP may also change, for example, a new access device STA is added or an original connection is disconnected, and in these situations, a beam recalibration adjustment process may also be triggered. Therefore, the method further optionally includes the following steps.

At Step 408: when the multiple access devices STAs connected to the signal access point AP change, a beam calibration process between the multi-stream convertor OMC and the changed access device STA is executed, to update the beam direction weight between the multi-stream convertor OMC and the changed access device STA, and a signal wave is transmitted according to the updated beam direction weight.

In the present step, it may be assumed that the AP is originally connected with N user devices {STA_0, STA_1 ... STA_{N-1}} through the OMC. When a new device STA_X accesses the AP, the AP can send a message to the OMC through the PLC network, the message containing information of allocation of RU by the STA_X on the OFDMA frame. The OMC can feedback to the AP the number of wide beams to be scanned for the STA_X.

Subsequently, the AP initiates a wide beam measurement, which process may be similar to the above Step 402 of the beam calibration from the OMC to the STAs, merely with a difference that only an optimal wide beam of the STA_X needs to be selected after the wide beam measurement is finished. Then the narrow beam scan is performed on the optimal wide beam, which process may be similar to Step 403 of the beam calibration from the OMC to the STAs, and finally the beam direction weight of the STA_X is determined.

In a subsequent process of transmitting and sending the data between the AP and the various STAs, the OMC may superimpose a sending symbol of STA_X on the original multi-stream sending symbol $SIG_{mimo}$, that is, the updated sending symbol is represented as:

$$SIGX_{mimo} = SIG_{mimo} + W_X * SIG_X$$

where $SIG_X$ is a symbol sent by the AP to STA_X, and $W_X$ is the beam direction weight used by the STA_X.

In an optional implementation, when a certain existing STA is disconnected from the AP, the AP can send a message to inform the OMC, the message containing the RU used by the STA in the OFDMA. After that, when the OMC generates the multi-stream sending symbol $SIG_{mimo}$, the symbol on the RU is not superposed, and in this way, the OMC no longer generates a beam for the disconnected device.

The above wireless communication method may dynamically adjust the wireless communication system by the calibration process, so that multi-stream concurrent engineering of the wireless communication system can be adapted to different environments, thereby improving the stability of network communication. For the access of a new user device and a disconnected user device, the beam calibration and MIMO beam updating of the new device can be realized, and the beam of the disconnected device can be removed.

Figure 5A:
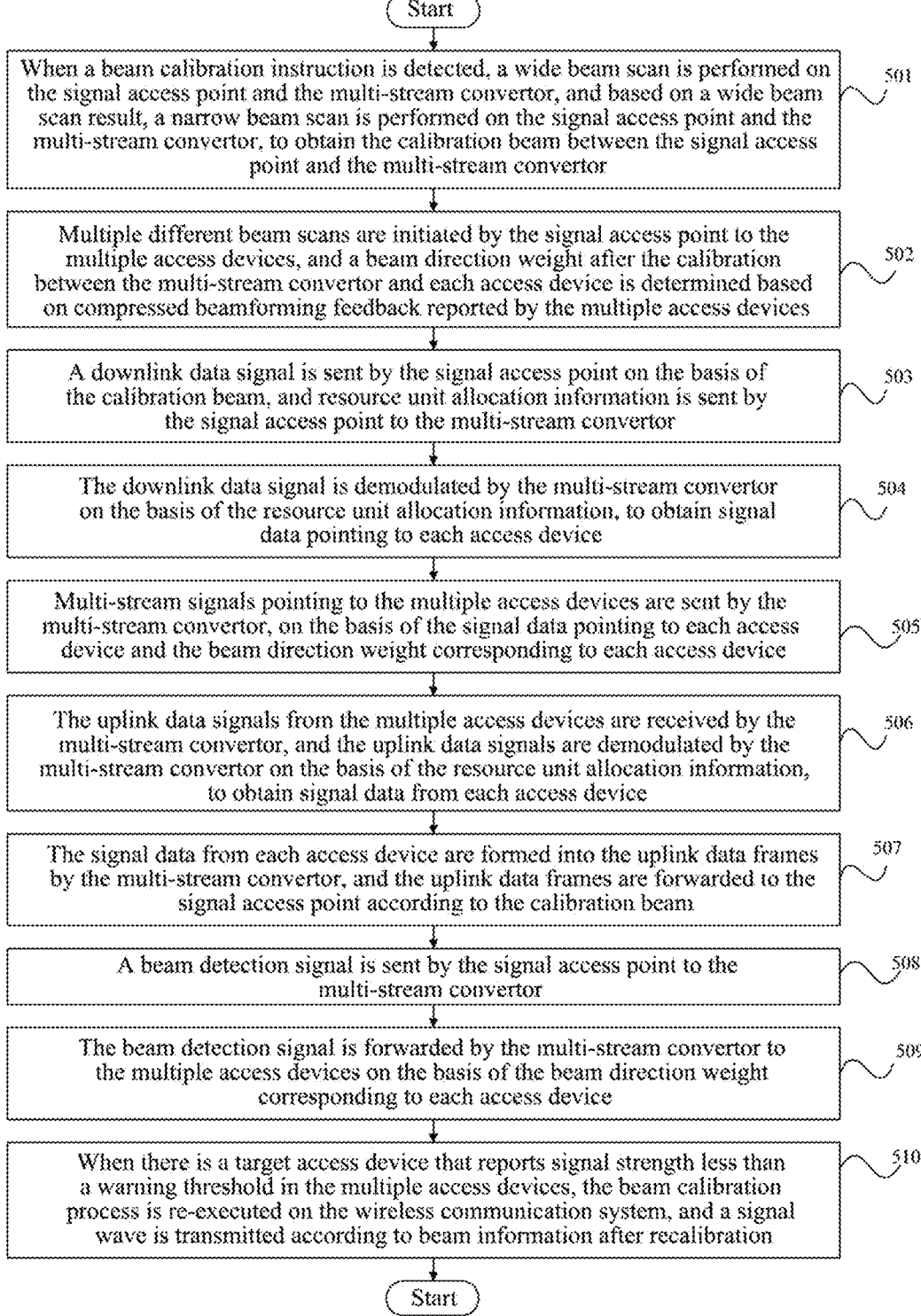
FIG. 5A is a schematic flow chart of a wireless communication method provided in embodiments of the present disclosure.

Referring to FIG. 5A, it shows a wireless communication method according to an embodiment of the present disclosure. The method may be executed by the electronic device 1 as shown in FIG. 1, and may be applied to the wireless communication system as shown in FIG. 2, so that when the access point AP and the access devices STAs are located in different spaces, multi-stream signal concurrency is realized between the access point AP and the access devices STAs, thereby expanding the application range of the wireless communication and improving the application flexibility. The method optionally includes the following steps.

At Step 501: when a beam calibration instruction is detected, a wide beam scan is performed on the signal access point AP and the multi-stream convertor OMC, and based on a wide beam scan result, a narrow beam scan is performed on the signal access point AP and the multi-stream convertor OMC, to obtain the calibration beam between the signal access point AP and the multi-stream convertor OMC. For details, reference is made to the description of Step 401 in the above embodiment.

At Step 502: when the beam calibration instruction is detected, multiple different beam scans are initiated by the signal access point AP to the multiple access devices STAs, and a beam direction weight after the calibration between the multi-stream convertor OMC and each access device STA is determined based on compressed beamforming feedback reported by the multiple access devices STAs. For details, reference is made to the description of Step 402 in the above embodiment.

At Step 503: a downlink data signal is sent by the signal access point AP on the basis of the calibration beam, and resource unit allocation information is sent by the signal access point AP to the multi-stream convertor OMC. For details, reference is made to the description of Step 301 in the above embodiment.

At Step 504: the downlink data signal is demodulated by the multi-stream convertor OMC on the basis of the resource unit allocation information, to obtain signal data pointing to each access device STA. For details, reference is made to the description of Step 302 in the above embodiment.

At Step 505: multi-stream signals pointing to the multiple access devices STAs are sent by the multi-stream convertor OMC, on the basis of the signal data pointing to each access device STA and the beam direction weight corresponding to each access device STA. For details, reference is made to the description of Step 303 in the above embodiment.

At Step 506: the uplink data signals from the multiple access devices STAs are received by the multi-stream convertor OMC, and the uplink data signals are demodulated by the multi-stream convertor OMC on the basis of the resource unit allocation information, to obtain signal data from each access device STA. For details, reference is made to the description of Step 304 in the above embodiment.

At Step 507: the signal data from each access device STA are formed into the uplink data frames by the multi-stream convertor OMC, and the uplink data frames are forwarded to the signal access point AP according to the calibration beam. For details, reference is made to the description of Step 305 in the above embodiment.

In actual use scenarios, users' living environments may be dynamically changed, and the indoor WiFi coverage effect may change due to addition, removal or position movement of indoor items, and thus real time monitoring may be performed by the AP, to restart the beam calibration process for the above situation. Therefore, this method further optionally includes the following steps.

At Step 508: a beam detection signal is sent by the signal access point AP to the multi-stream convertor OMC.

In the present step, for example, due to change of indoor items or movement of client devices, the MU-MIMO multiple streams originally used by the OMC may be reduced in performance and the beam direction needs to be recalibrated. The beam measurement process may be irregularly started by the AP, to check a current beam using state. For example, the AP may send "Using Beam Measurement" message to the OMC through the PLC network.

At Step 509: the beam detection signal is forwarded by the multi-stream convertor OMC to the multiple access devices STAs on the basis of the beam direction weight corresponding to each access device STA.

Figure 5B:
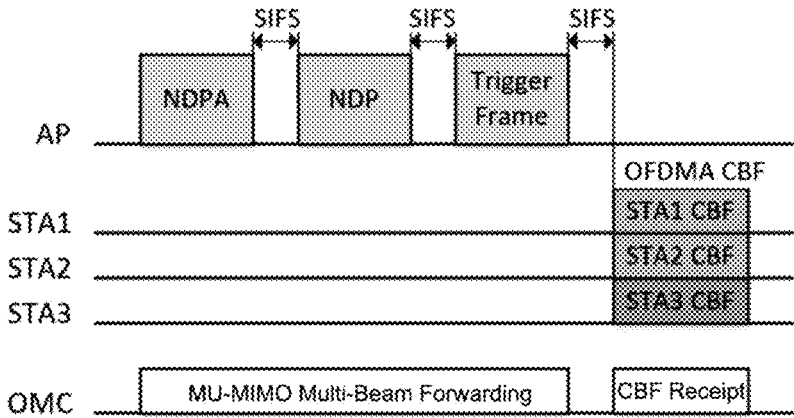
FIG. 5B is a schematic diagram of re-performing a beam measurement process in embodiments of the present disclosure.

In the present step, the process is similar to the calibration of single beam measurement of the beam from the OMC to the STAs in Step 402, and the difference is that the OMC forwards the received downlink data of the AP to the various STAs using MU-MIMO multiple beams instead of using single beam for forwarding. As shown in FIG. 5B, three access devices STA1, STA2, and STA3 are taken as an example. Assume that a sent symbol of the beam detection signal is $SIG_{sd}$, the beam direction weight after calibration corresponding to each of the STAs is represented as $W_i$, then the symbol sent by the multi-stream convertor OMC in a MU-MIMO mode is:

$$SIG\_SD_{mimo} = \sum_{i=0}^{M-1} W_i * SIG_{sd}$$

The OMC may receive the CBF reported by various STAs, and complete the measurement of the currently used beam, thereby evaluating whether current MU-MIMO spatial multiple streams are suitable.

At Step 510: when there is a target access device STA that reports signal strength less than a warning threshold in the multiple access devices STAs, the beam calibration process is re-executed on the wireless communication system, and a signal wave is transmitted according to beam information after recalibration.

In the present step, when there is a target access device that reports signal strength less than the warning threshold in the multiple access devices STAs, for example, when the OMC detects that the signal strength reported by a certain access device $STA_i$ is less than the warning threshold, it indicates that beam quality of the $STA_i$ is lower than threshold, and the beam calibration process of the $STA_i$ is started. Specifically, the OMC may select to scan a wide beam sequence, wherein a scanning order is: firstly, selecting a wide beam covering the beam direction originally used by the $STA_i$ to scan, and secondly, scanning a wide beam with a smaller angle difference from the beam direction originally used by the $STA_i$. The scanning process may be similar to the wide beam scan process from the OMC to the STAs in the above Step 402, merely with the difference that only the optimal wide beam of the $STA_i$ is selected after the wide beam measurement is finished. Then narrow beam scan is performed on the optimal wide beam of the $STA_i$, the narrow beam scan process is similar to the narrow beam scan process from the OMC to the STAs in the above Step 402. Finally, a new beam direction weight of the $STA_i$ is obtained.

After the new beam direction weight is obtained, the OMC uses the latest beam direction weight of the $STA_i$ to calculate the multi-stream sending symbol $SIG_{mimo}$, thereby realizing dynamic updating of the multi-stream spatial direction of the MU-MIMO by the OMC, and ensuring reliable operation of the entire WiFi network in an indoor environment.

In the above wireless communication method, the beam detection signal is sent to the multi-stream convertor OMC, the multi-stream convertor OMC is instructed to forward the beam detection signal to the multiple access devices STAs, and on the basis of the received signal strength reported by the access devices STAs, it is judged whether there is a target access device whose received signal strength is less than the warning threshold in the multiple access devices STAs, wherein when such target access device exists, it indicates that the signal that can be received by the target access device through the signal access point AP is weak, and in this case, the beam calibration process can be dynamically executed on the wireless communication system, and the signal wave is transmitted according to the beam information after the recalibration, so that all of the access devices STAs, including the target access device, can have good signal receiving effect. It is realized that for indoor signal propagation environment changes, the beam with poor signal quality is adjusted in time according to a monitoring result, thereby ensuring reliable use of the entire WiFi network MU-MIMO in indoor environments.

Figure 6:
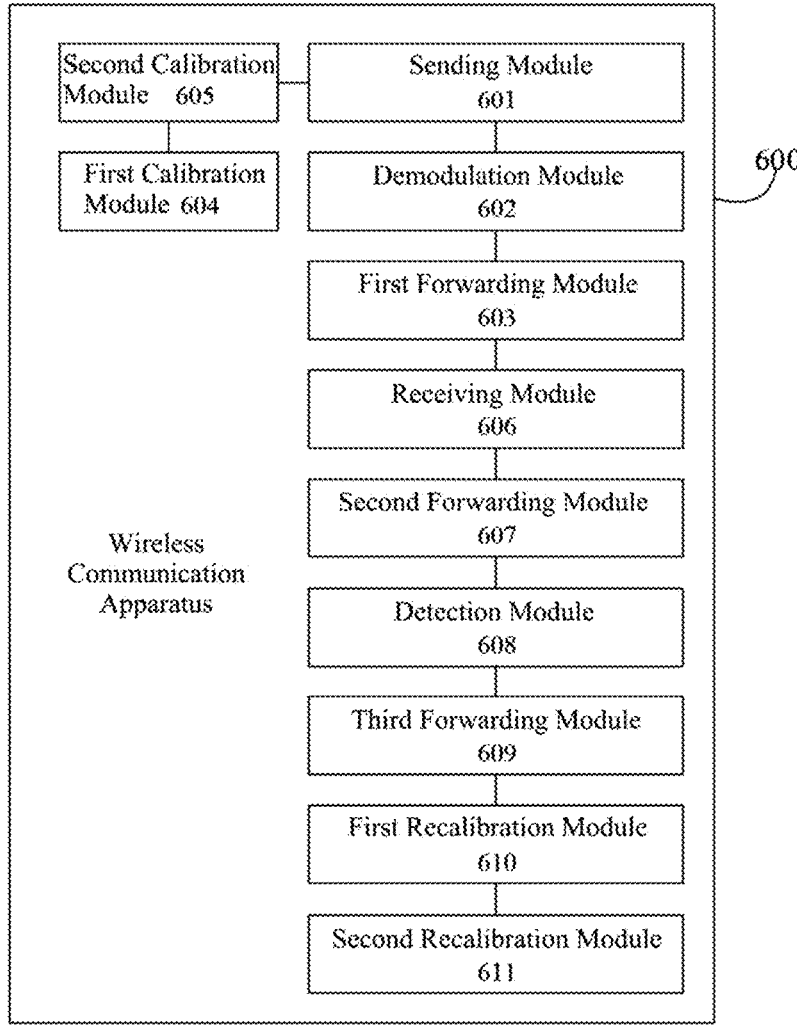
FIG. 6 is a structural schematic diagram of a wireless communication apparatus provided in embodiments of the present disclosure.

Referring to FIG. 6, it shows a wireless communication apparatus 600 according to an embodiment of the present disclosure. The apparatus may be applied to the electronic device 1 as shown in FIG. 1, and may be applied to the wireless communication system as shown in FIG. 2, so that when the access point AP and the access devices STAs are located in different spaces, multi-stream signal concurrency is realized between the access point AP and the access devices STAs, thereby expanding the application range of the wireless communication and improving the application flexibility. The apparatus may include: a sending module 601, a demodulation module 602 and a first forwarding module 603. Principle relations between various modules are as follows.

The sending module 601 may be configured to send, by the signal access point AP, a downlink data signal on the basis of a calibration beam, and send, by the signal access point AP, resource unit allocation information to the multi-stream convertor OMC. In the above, the calibration beam may be a beam after the calibration between the signal access point AP and the multi-stream convertor OMC. The demodulation module 602 may be configured to demodulate, by the multi-stream convertor OMC, the downlink data signal on the basis of the resource unit allocation information, to obtain signal data pointing to each access device STA. The first forwarding module 603 may be configured to send, by the multi-stream convertor OMC, multi-stream signals pointing to the multiple access devices STAs on the basis of the signal data pointing to each access device STA and a beam direction weight corresponding to each access device STA, wherein the beam direction weight may be determined on the basis of a beam direction after the calibration between the multi-stream convertor OMC and each access device STA.

In an optional implementation, the apparatus may further include: a first calibration module 604, configured to perform, before sending the downlink data signal by the signal access point AP on the basis of the calibration beam, when detecting a beam calibration instruction, a wide beam scan on the signal access point AP and the multi-stream convertor OMC; and perform, based on a wide beam scan result, a narrow beam scan on the signal access point AP and the multi-stream convertor OMC, to obtain the calibration beam between the signal access point AP and the multi-stream convertor OMC In an optional implementation, the apparatus may further include: a second calibration module 605, configured to initiate, before sending the downlink data signal by the signal access point AP on the basis of the calibration beam, when detecting a beam calibration instruction, multiple different beam scans by the signal access point AP to the multiple access devices STAs; and determine, based on compressed beamforming feedback reported by the multiple access devices STAs, a beam direction weight after the calibration between the multi-stream convertor OMC and each access device STA.

In an optional implementation, the second calibration module 605 may be configured to: send the resource unit allocation information to the multi-stream convertor OMC, and receive the number of wide beams returned by the multi-stream convertor OMC; instruct the multi-stream convertor OMC to send multiple wide beams, and send a signal measurement instruction to the multiple access devices STAs; send detection data frames to the multiple access devices STAs, the detection data frames being configured to instruct the multiple access devices STAs to detect strength of received signals; send trigger frames to the multiple access devices STAs, the trigger frames being configured to instruct the multiple access devices STAs to report detected signal strength; receive first compressed beamforming feedback reported by each access device STA, wherein the first compressed beamforming feedback may carry a first signal strength set of multiple wide beams detected by each access device STA; and select, for each access device STA, a target wide beam corresponding to a maximum value in the first signal strength set, to form an optimal wide beam set.

In an optional implementation, the second calibration module 605 may further be configured to: instruct the multi-stream convertor OMC to divide the target wide beam in the optimal wide beam set into multiple narrow beams, instruct the multi-stream convertor OMC to send the multiple narrow beams, and send a signal measurement instruction to the multiple access devices STAs; send the detection data frames to the multiple access devices STAs, and send the trigger frames to the multiple access devices STAs; receive second compressed beamforming feedback reported by each access device STA, the second compressed beamforming feedback carrying a second signal strength set of the multiple narrow beams detected by each access device STA; and select, for each access device STA, a target narrow beam corresponding to a maximum value in the second signal strength set, and take the target narrow beam as a beam direction weight after the calibration between the multi-stream convertor OMC and the corresponding access device STA.

In an optional implementation, the apparatus may further include: a receiving module 606, configured to receive, by the multi-stream convertor OMC, the uplink data signals from the multiple access devices STAs, and demodulate, by the multi-stream convertor OMC, the uplink data signals on the basis of the resource unit allocation information, to obtain signal data from each access device STA; and a second forwarding module 607, configured to form, by the multi-stream convertor OMC, the signal data from each access device STA into the uplink data frames, and forward the uplink data frames to the signal access point AP according to the calibration beam.

In an optional implementation, the apparatus may further include: a detection module 608, configured to send, by the signal access point AP, a beam detection signal to the multi-stream convertor OMC; a third forwarding module 609, configured to forward, by the multi-stream convertor OMC, the beam detection signal to the multiple access devices STAs on the basis of the beam direction weight corresponding to each access device STA; a first recalibration module 610, configured to re-execute, when there is a target access device STA that reports signal strength less than a warning threshold in the multiple access devices STAs, the beam calibration process on the wireless communication system, and transmit a signal wave according to beam information after the recalibration.

In an optional implementation, the apparatus may further include: a second recalibration module 611, configured to execute, when the multiple access devices STAs connected to the signal access point AP have change, a beam calibration process between the multi-stream convertor OMC and the changed access device STA, to update a beam direction weight between the multi-stream convertor OMC and the changed access device STA, and transmit a signal wave according to the updated beam direction weight.

For detailed description of the above wireless communication apparatus 600, reference can be made to description of relevant method steps in the above embodiments.

Embodiments of the present disclosure further provide a non-transient storage medium readable by the electronic device 1, which may include: a program, configured to make, when run on the electronic device 1, the electronic device 1 be capable of executing all or a part of the processes of the method in the above embodiments. In the above, the storage medium may be a magnetic disk, an optical disk, a read-only memory (ROM), a random access memory (RAM), a flash memory, a hard disk drive (abbreviated as HDD), a solid-state drive (SSD) or the like. The storage medium may also include a combination of memories of the kinds described above.

Although the embodiments of the present disclosure are described in conjunction with the drawings, those skilled in the art could make various modifications and variations without departing from the spirit and scope of the present disclosure, and all of these modifications and variations fall within the scope defined by the attached claims.

INDUSTRIAL APPLICABILITY

The present disclosure provides a wireless communication method, an apparatus, a system, a device and a storage medium. The method includes: sending, by a signal access point, a downlink data signal on the basis of a calibration beam, and sending, by the signal access point, resource unit allocation information to a multi-stream convertor, the calibration beam being a beam after calibration between the signal access point and the multi-stream convertor; demodulating, by the multi-stream convertor, the downlink data signal on the basis of resource unit allocation information, to obtain signal data pointing to each access device; and sending, by the multi-stream convertor, multi-stream signals pointing to the multiple access devices, on the basis of the signal data pointing to each access device and a beam direction weight corresponding to each access device, the beam direction weight being determined on the basis of a beam direction after the calibration between the multi-stream convertor and each access device. The present disclosure realizes the multi-stream signal concurrency between the access point and the access devices, thereby expanding the application range of the wireless communication and improving the application flexibility.

In addition, it can be understood that the wireless communication method, apparatus, system, device and storage medium in the present disclosure are reproducible, and is applicable in various industrial applications. For example, the wireless communication method, apparatus, system, device and storage medium in the present disclosure is applicable in scenarios where WiFi is needed for wireless communication in indoor environments.

What is claimed is:

1. A wireless communication method, applied to a wireless communication system, wherein the wireless communication system comprises a signal access point, a multi-stream convertor and multiple access devices, the method comprising:

sending, by the signal access point, a downlink data signal on the basis of a calibration beam, and sending, by the signal access point, resource unit allocation information to the multi-stream convertor, wherein the calibration beam is a beam after calibration between the signal access point and the multi-stream convertor;

demodulating, by the multi-stream convertor, the downlink data signal on the basis of the resource unit allocation information, to obtain signal data pointing to each of the multiple access devices; and sending, by the multi-stream convertor, multi-stream signals pointing to the multiple access devices, on the basis of the signal data pointing to each of the multiple access devices and a beam direction weight corresponding to each of the multiple access devices, wherein the beam direction weight is determined on the basis of a beam direction after calibration between the multi-stream convertor and each of the multiple access devices.

2. The method according to claim 1, wherein before the step of sending, by the signal access point, a downlink data signal on the basis of a calibration beam, the method further comprising:

performing, when detecting a beam calibration instruction, a wide beam scan on the signal access point and the multi-stream convertor, and performing, based on a wide beam scan result, a narrow beam scan on the signal access point and the multi-stream convertor, to obtain the calibration beam between the signal access point and the multi-stream convertor.

3. The method according to claim 1, wherein before the step of sending, by the signal access point, a downlink data signal on the basis of a calibration beam, the method further comprises a step of:

initiating, when detecting a beam calibration instruction, by the signal access point, multiple different beam scans to the multiple access devices, and determining, based on compressed beamforming feedback reported by the multiple access devices, a beam direction weight after calibration between the multi-stream convertor and each of the multiple access devices.

4. The method according to claim 3, wherein the step of initiating, by the signal access point, multiple different beam scans to the multiple access devices, and determining, based on compressed beamforming feedback reported by the multiple access devices, a beam direction weight after calibration between the multi-stream convertor and each of the multiple access devices comprises steps of:

sending the resource unit allocation information to the multi-stream convertor, and receiving number of wide beams returned by the multi-stream convertor;

instructing the multi-stream convertor to send multiple wide beams, and sending a signal measurement instruction to the multiple access devices;

sending detection data frames to the multiple access devices, wherein the detection data frames is configured to instruct the multiple access devices to detect signal strength received;

sending trigger frames to the multiple access devices, wherein the trigger frames is configured to instruct the multiple access devices to report detected signal strength;

receiving first compressed beamforming feedback reported by each of the multiple access devices, wherein the first compressed beamforming feedback carries a first signal strength set of the multiple wide beams detected by each of the multiple access devices; and selecting, for each of the multiple access devices, a target wide beam corresponding to a maximum value in the first signal strength set, to form an optimal wide beam set.

5. The method according to claim 4, wherein the step of initiating, by the signal access point, multiple different beam scans to the multiple access devices, and determining, based on compressed beamforming feedback reported by the multiple access devices, a beam direction weight after calibration between the multi-stream convertor and each of the multiple access devices further comprises steps of:

instructing the multi-stream convertor to divide the target wide beam in the optimal wide beam set into multiple narrow beams, instructing the multi-stream convertor to send the multiple narrow beams, and sending a signal measurement instruction to the multiple access devices;

sending the detection data frames to the multiple access devices, and sending the trigger frames to the multiple access devices;

receiving second compressed beamforming feedback reported by each of the multiple access devices, wherein the second compressed beamforming feedback carries a second signal strength set of the multiple narrow beams detected by each of the multiple access devices; and selecting, for each of the multiple access devices, a target narrow beam corresponding to a maximum value in the second signal strength set, and taking the target narrow beam as a beam direction weight after calibration between the multi-stream convertor and the corresponding access device.

6. The method according to claim 1, further comprising:

receiving, by the multi-stream convertor, uplink data signals from the multiple access devices, and demodulating, by the multi-stream convertor, the uplink data signals on the basis of the resource unit allocation information, to obtain signal data from each of the multiple access devices; and forming, by the multi-stream convertor, the signal data from each of the multiple access devices into uplink data frames, and forwarding the uplink data frames to the signal access point according to the calibration beam.

7. The method according to claim 1, further comprising:

sending, by the signal access point, a beam detection signal to the multi-stream convertor;

forwarding, by the multi-stream convertor, the beam detection signal to the multiple access devices on the basis of the beam direction weight corresponding to each of the multiple access devices; and re-executing, when there is a target access device that reports a signal strength less than a warning threshold in the multiple access devices, a beam calibration process on the wireless communication system, and transmitting a signal wave according to beam information after recalibration.

8. The method according to claim 7, wherein the step of sending, by the signal access point, a beam detection signal to the multi-stream convertor further comprises:

starting irregularly the beam measurement process by the signal access point, to check a current beam using state.

9. The method according to claim 1, further comprising:

executing, when the multiple access devices connected to the signal access point are changed, a beam calibration process between the multi-stream convertor and a changed access device, to update the beam direction weight between the multi-stream convertor and the changed access device, and transmitting a signal wave according to the updated beam direction weight.

10. An electronic device, comprising:

a memory, configured to store a computer program; and a processor, configured to execute the computer program, so as to implement the method according to claim 1.

11. The electronic device according to claim 10, wherein the electronic device is a gateway device, a mobile phone, a tablet computer, a notebook computer, a desktop computer or a large-scale computing system composed of multiple computers having a power line communication (PLC) function.

12. A non-transient electronic device-readable storage medium, comprising: a program, configured to make, when run by an electronic device, the electronic device execute the method according to claim 1.

13. The non-transient electronic device-readable storage medium according to claim 12, wherein the non-transient electronic device-readable storage medium is a magnetic disk, an optical disk, a read-only memory, a random access memory, a hard disk drive, a solid-state drive or a combination thereof.

14. The method according to claim 2, further comprising:

receiving, by the multi-stream convertor, uplink data signals from the multiple access devices, and demodulating, by the multi-stream convertor, the uplink data signals on the basis of the resource unit allocation information, to obtain signal data from each of the multiple access devices; and forming, by the multi-stream convertor, the signal data from each of the multiple access devices into uplink data frames, and forwarding the uplink data frames to the signal access point according to the calibration beam.

15. The method according to claim 3, further comprising:

receiving, by the multi-stream convertor, uplink data signals from the multiple access devices, and demodulating, by the multi-stream convertor, the uplink data signals on the basis of the resource unit allocation information, to obtain signal data from each of the multiple access devices; and forming, by the multi-stream convertor, the signal data from each of the multiple access devices into uplink data frames, and forwarding the uplink data frames to the signal access point according to the calibration beam.

16. The method according to claim 4, further comprising:

receiving, by the multi-stream convertor, uplink data signals from the multiple access devices, and demodulating, by the multi-stream convertor, the uplink data signals on the basis of the resource unit allocation information, to obtain signal data from each of the multiple access devices; and forming, by the multi-stream convertor, the signal data from each of the multiple access devices into uplink data frames, and forwarding the uplink data frames to the signal access point according to the calibration beam.

17. The method according to claim 5, further comprising:

receiving, by the multi-stream convertor, uplink data signals from the multiple access devices, and demodulating, by the multi-stream convertor, the uplink data signals on the basis of the resource unit allocation information, to obtain signal data from each of the multiple access devices; and forming, by the multi-stream convertor, the signal data from each of the multiple access devices into uplink data frames, and forwarding the uplink data frames to the signal access point according to the calibration beam.

18. The method according to claim 2, further comprising:

sending, by the signal access point, a beam detection signal to the multi-stream convertor; forwarding, by the multi-stream convertor, the beam detection signal to the multiple access devices on the basis of the beam direction weight corresponding to each of the multiple access devices; and re-executing, when there is a target access device that reports a signal strength less than a warning threshold in the multiple access devices, a beam calibration process on the wireless communication system, and transmitting a signal wave according to beam information after recalibration.

19. The method according to claim 3, further comprising:

sending, by the signal access point, a beam detection signal to the multi-stream convertor; forwarding, by the multi-stream convertor, the beam detection signal to the multiple access devices on the basis of the beam direction weight corresponding to each of the multiple access devices; and re-executing, when there is a target access device that reports a signal strength less than a warning threshold in the multiple access devices, a beam calibration process on the wireless communication system, and transmitting a signal wave according to beam information after recalibration.

20. The method according to claim 4, further comprising:

sending, by the signal access point, a beam detection signal to the multi-stream convertor; forwarding, by the multi-stream convertor, the beam detection signal to the multiple access devices on the basis of the beam direction weight corresponding to each of the multiple access devices; and re-executing, when there is a target access device that reports a signal strength less than a warning threshold in the multiple access devices, a beam calibration process on the wireless communication system, and transmitting a signal wave according to beam information after recalibration.

\* \* \* \* \*